Patented May 8, 1945

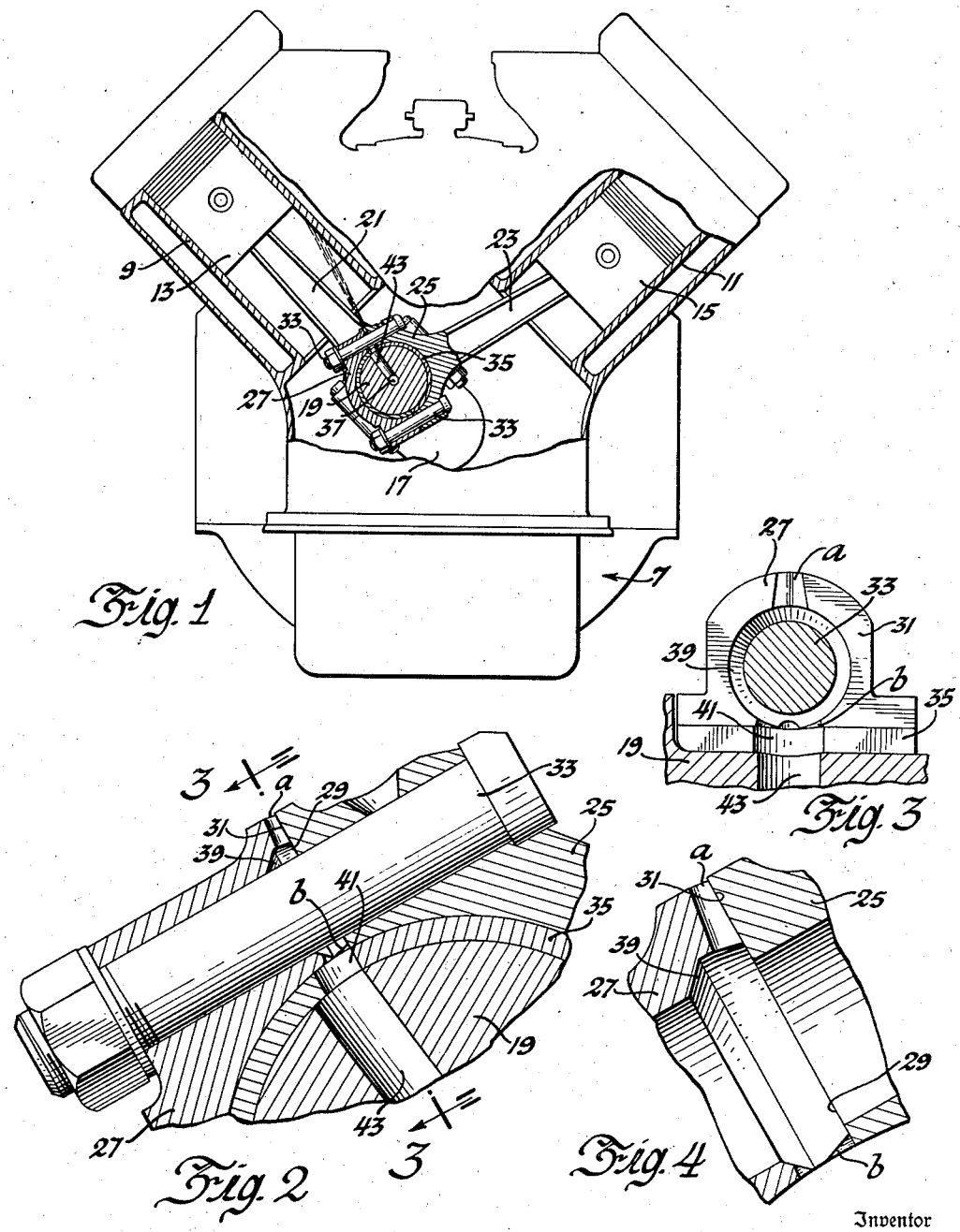

2,375,612

UNITED STATES PATENT OFFICE 2,375,612

CYLINDER BORE LUBRICATION

Harry F. Barr, Detroit, Mich., assignor to General Motors Corporation, Detroit, Mich., a corporation of Delaware Application February 9, 1942, Serial No. 430,034

4 Claims. (Cl. 184—6)

This invention relates to lubrication and has been designed particularly for the lubrication of the walls of the cylinders of internal combustion engines.

An object of the invention is to provide an intermittent discharge of lubricating oil to the cylinder walls.

A further object is to modify the connecting rod construction so that such rods may be used in the delivery of oil to the cylinder wall.

A more specific object, and one concerned with V-shaped engines having two rods rotatably supported on one crankpin and associated with opposite cylinders, is to arrange for the lubrication of one cylinder by means associated with the rod of the piston of the other cylinder.

A further object is to provide a modification of the cap associated with the rod end to thereby avoid holes or other formations which weaken the rod end proper.

Other objects and advantages will be understood from the specification which follows.

On the drawing

Figure 1 is a view in elevation and partly in section of a V-shaped engine.

Figure 2 is an enlarged transverse section of the connection between a crankpin and a connecting rod.

Figure 3 is a view as seen from line 3—3 of Figure 2.

Figure 4 is a view in section (like Figure 2) but with a connecting bolt removed.

Referring to the drawing there is shown an engine of the V-type. The engine is marked 7. Two of its oppositely arranged cylinders 9 and 11 have pistons 13 and 15, respectively. At 17 is shown the crankshaft of the engine. One of the crankpins is marked 19. Connecting rods 21 and 23 are rotatably mounted on this pin. Rod 21 extends into cylinder 9 and is connected to piston 13. Rod 23 is similarly connected to piston 15.

Each connecting rod has at its crankpin end an arcuate region, that of rod 23 being marked 25. Associated with each such end is a cap, such as that marked 27. The arcuate faces of the rod end and cap have mating surfaces 29 and 31. Bolts 33 are used to secure the caps to the rod ends. Any suitable bearing members marked 35 may be used within the rod end and cap and around the crankpin.

The crankshaft and pins are provided with axial passages, that in the pin being marked 37. Such a passage has been commonly provided heretofore. Oil under pressure from an engine driven pump passes through this passage and by means of radial passages in the main and rod bearings has been used to lubricate the relatively rotating surfaces. It has been proposed, also in the past, to lubricate the cylinder walls from this source of oil under pressure. One method has been to provide a hole through the connecting rod end so located and directed as to register at intervals with the radial passage in the crankpin and to deliver a stream of oil to the cylinder wall. Such a hole weakens the rod end just where the stresses are greatest and it has been deemed necessary to reinforce the rod end to offset the weakening.

This invention aims to secure the wall lubrication without the disadvantage of weakening the rod end. For this purpose the modification is made in the cap, not in the rod itself. The face 31 of the cap is beveled as at 39 in the region around one of the bolts 33. A milling cutter cuts a channel diametrically across the bolt opening of the cap from the peripheral margin $a$ to the inner region $b$ where the cap embraces the bushing. This channel increases in depth and in breadth from $a$ to $b$ as appears from the drawing. A registering hole 41 is pierced in the bushing. A radial hole 43 is formed in the crankpin to connect hole 41 and the cap channel from $a$ to $b$ around bolt 33 at such a position of relative rotation that oil from the axial passage 37 may be forced through the cap face channel and be discharged upon the wall of cylinder 9. It thus appears that the oiling provision of rod 23 associated with cylinder 11 functions to lubricate cylinder 9. In a similar manner cylinder 11 is lubricated by the crank end of rod 21.

By the expedient described the cylinders are lubricated without weakening the crankpin ends of the connecting rods by an expedient which is effective and inexpensive.

I claim:

1. Engine lubricating means comprising a first cylinder, a piston therein, a crankshaft having a crankpin, a connecting rod between said piston and crankpin, a second cylinder angularly related to the first cylinder, said crankshaft pin having an axial lubricating passage and said connecting rod end having a cap, said cap having a channel formation including a groove extending radially from its inner to its outer circumference and directed toward the wall of said second cylinder in one position of crankshaft rotation and said crankshaft pin having a radial passage connected to said axial passage, said radial passage being positioned to register with said cap channel when the latter is directed toward a wall of said second cylinder.

2. Engine lubricating means comprising a first cylinder, a piston therein, a crankshaft having a crankpin, a connecting rod between said piston and crankpin, a second cylinder angularly related to the first cylinder, said crankshaft pin having an axial lubricating passage and said connecting rod end having a cap, said cap having a channel formation including a groove extending radially from its inner to its outer circumference and directed toward the wall of said second cylinder in one position of crankshaft rotation and said crankshaft pin having a radial passage connected to said axial passage, said radial passage being positioned to register with said cap channel when the latter is directed toward a wall of said second cylinder, bolt means connecting mating faces of said connecting rod and cap, said channel formation comprising a second groove on the face of said cap and around said bolt and said first named groove intersecting said second named groove and extending diametrically across the bolt opening in the cap.

3. Engine lubricating means comprising a first cylinder, a piston therein, a crankshaft having a crankpin, a connecting rod between said piston and crankpin, a second cylinder angularly related to the first cylinder, said crankshaft pin having an axial lubricating passage and said connecting rod end having a cap, said cap having a channel formation including a groove extending radially from its inner to its outer circumference and directed toward the wall of said second cylinder in one position of crankshaft rotation and said crankshaft pin having a radial passage connected to said axial passage, said radial passage being positioned to register with said cap channel when the latter is directed toward a wall of said second cylinder, bolt means connecting mating faces of said connecting rod and cap, said channel formation comprising a second groove on the face of said cap and around said bolt and said first named groove intersecting said second named groove and extending diametrically across the bolt opening in the cap and increasing in depth and breadth toward the inner portion thereof.

4. Lubricating means for the walls of angularly related cylinders, a crankshaft, a crankpin constituting a part thereof, two adjacent connecting rods rotatably mounted on said crankpin, pistons in said cylinders, said connecting rods connected to said pistons, each connecting rod having a cap secured thereto at its crankpin end, each cap having a channel formation including a part directed radially of said pin, the extensions of each said radially directed part intersecting the wall of the cylinder associated with the other connecting rod at one position of crankshaft rotation, and conduit means to supply said channel formation with lubricating fluid.

HARRY F. BARR.